US009858039B2

(12) United States Patent
Kumar et al.

(10) Patent No.: US 9,858,039 B2
(45) Date of Patent: Jan. 2, 2018

(54) VOICE RECOGNITION OF COMMANDS EXTRACTED FROM USER INTERFACE SCREEN DEVICES

(71) Applicant: Oracle International Corporation, Redwood Shores, CA (US)

(72) Inventors: Saurabh Kumar, Andhra Pradesh (IN); Srinivasa Rao Kowdeed, Andhra Pradesh (IN); Kavin Kumar Kuppusamy, Tamil Nadu (IN)

(73) Assignee: Oracle International Corporation, Redwood Shores ( * ) Notice: Subject to any disclaimer, the term of this patent is extended or adjusted under 35 U.S.C. 154(b) by 456 days.

(21) Appl. No.: 14/166,806

(22) Filed: Jan. 28, 2014

(65) Prior Publication Data

US 2015/0212791 A1    Jul. 30, 2015

(51) Int. Cl.
*G06F 3/16* (2006.01)
*G10L 15/22* (2006.01)
*G10L 15/26* (2006.01)

(52) U.S. Cl.
CPC .............. *G06F 3/167* (2013.01); *G10L 15/22* (2013.01); *G10L 15/26* (2013.01); *G10L 2015/223* (2013.01); *G10L 2015/228* (2013.01)

(58) Field of Classification Search
CPC ........... G06F 21/32; G06F 3/017; G06F 3/167
See application file for complete search history.

(56) References Cited

U.S. PATENT DOCUMENTS 5,864,808 A * 1/1999 Ando ..................... G06K 9/033
704/211
6,029,135 A 2/2000 Krasle
(Continued)

FOREIGN PATENT DOCUMENTS

| CN | 101989279 A | 3/2011 |
|----|-------------|--------|
| EP | 1 209 660 A2 | 5/2002 |
| KR | 20100067371 A | 6/2010 |

OTHER PUBLICATIONS

Allinger et al., Applications of speech technology to unmanned vehicles; © 2001; IEEE; 8 pages.*

(Continued)

*Primary Examiner* — Linh K Pham
(74) *Attorney, Agent, or Firm* — Vista IP Law Group, LLP

(57) ABSTRACT

A method, system, and computer program product for human interface design. Embodiments proceed upon receiving a markup language description of user interface pages (e.g., HTML pages), then, without modifying the user interface page, parsing the markup language description to identify user interface objects configured to perform an operation responsive to a keyboard or mouse or pointing device. One or more mapping techniques serve to relate the parsed-out operation(s) to one or more voice commands. In some embodiments, the parser recognizes interface objects in forms such as a button, a textbox, a checkbox, or an option menu, and the voice commands correspond to an aspect that is displayed when rendering the interface object (e.g., a button label, a menu option, etc.). After receiving a user utterance, the utterance is converted into a text representation which in turn is mapped to voice commands that were parsed from the user interface page.

20 Claims, 11 Drawing Sheets

(56) References Cited

U.S. PATENT DOCUMENTS

| | | | | |
|---|---|---|---|---|
| 6,771,743 | B1* | 8/2004 | Butler | H04L 29/06 379/67.1 |
| 2003/0078775 | A1* | 4/2003 | Plude | H04M 1/6075 704/235 |
| 2003/0182124 | A1 | 9/2003 | Khan | |
| 2005/0179540 | A1* | 8/2005 | Rubenstein | B60R 16/0373 340/539.18 |
| 2006/0010386 | A1 | 1/2006 | Khan | |
| 2006/0206336 | A1* | 9/2006 | Gurram | G06F 3/167 704/275 |
| 2008/0032674 | A1* | 2/2008 | Kwon | H04M 3/53341 455/412.2 |
| 2008/0059196 | A1* | 3/2008 | Huang | G06F 17/30746 704/270 |
| 2008/0282160 | A1* | 11/2008 | Tonnison | G06F 9/4443 715/704 |
| 2009/0238348 | A1* | 9/2009 | Agarwal | G10L 15/265 379/93.01 |
| 2010/0013812 | A1* | 1/2010 | Gu | G06F 3/014 345/207 |
| 2010/0100383 | A1* | 4/2010 | Tsai | H04M 3/4938 704/257 |
| 2010/0105364 | A1* | 4/2010 | Yang | G06F 17/30663 455/414.1 |
| 2011/0105190 | A1* | 5/2011 | Cha | G06F 17/276 455/566 |
| 2011/0184730 | A1* | 7/2011 | LeBeau | G10L 15/30 704/201 |
| 2013/0096823 | A1* | 4/2013 | Katou | G01C 21/20 701/430 |
| 2013/0226575 | A1* | 8/2013 | Wlasiuk | G10L 15/1822 704/233 |
| 2013/0290856 | A1* | 10/2013 | Beveridge | G06F 3/1454 715/740 |
| 2014/0012585 | A1* | 1/2014 | Heo | H04N 21/233 704/270.1 |
| 2014/0067400 | A1* | 3/2014 | Yamazaki | G10L 13/08 704/260 |
| 2014/0096004 | A1* | 4/2014 | Zhou | G06F 3/167 715/728 |
| 2014/0282007 | A1* | 9/2014 | Fleizach | G06F 9/4446 715/728 |

OTHER PUBLICATIONS

Editors: Sampath et al., "Speech Input API Specification", W3C, Oct. 18, 2010, 9 pages.
Google, "Voice search on Google", Jan. 24, 2012, 2 pages.
Jennifer Kyrnin, "Collect Speech Input with HTML5 on Google Chrome", About Web Desigh/HTML, May 1, 2011, 1 page.
Colin Beckingham, "Trigger keyboard and mouse actions with your voice and xdotool", developerWorks., Oct. 15, 2011, 12 pages.
Kevin Christian et al., "A Comparison of Voice Controlled and Mouse Controlled Web Browsing", ACM, Assets'00, Nov. 13-15, 2000, Arlington, Virginia, 8 pages.
Scott McGlashan, "VoiceXMLandWMLConvergence", Mar. 20, 2012, 3 pages.
VozMe, "Add text-to-speech to your browser", Oct. 23, 2012, 1 page.
Asoftech, "Keyboard macro & Mouse macro program. Leading Windows macro recorder", AutoMe—automate computer tasks, Jul. 5, 2012, 3 pages.
"Phonetic algorithm", Mar. 11, 2012, 3 pages.
"Talking to Opera", Opera Tutorials, Aug. 2004, 3 pages.
Apache Commons, "Commons Codec", Version 1.7, Sep. 11, 2012, 1 page.
"Word frequency lists and dictionary from the Corpus of Contemporary American English", Oct. 3, 2012, 108 pages.

* cited by examiner

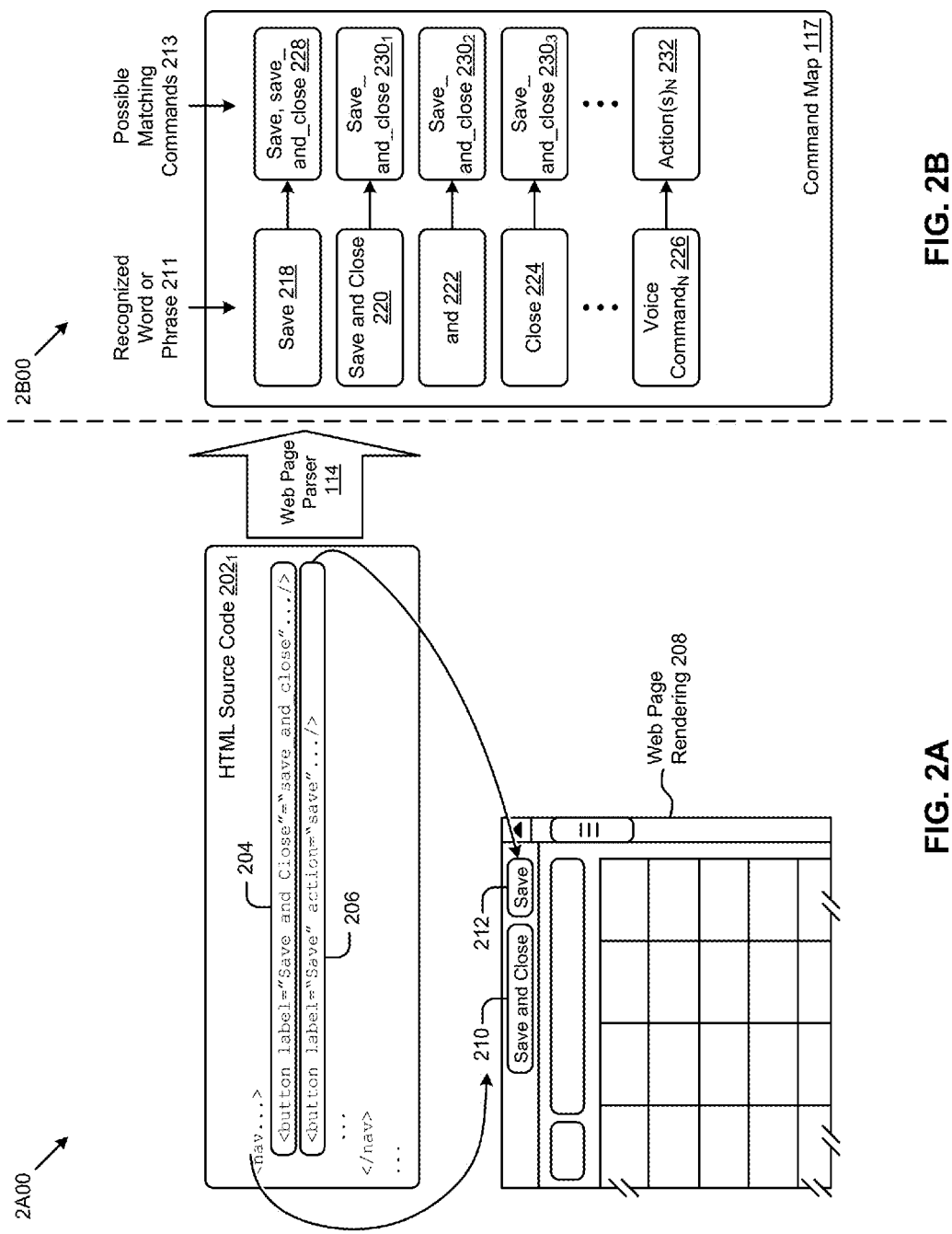

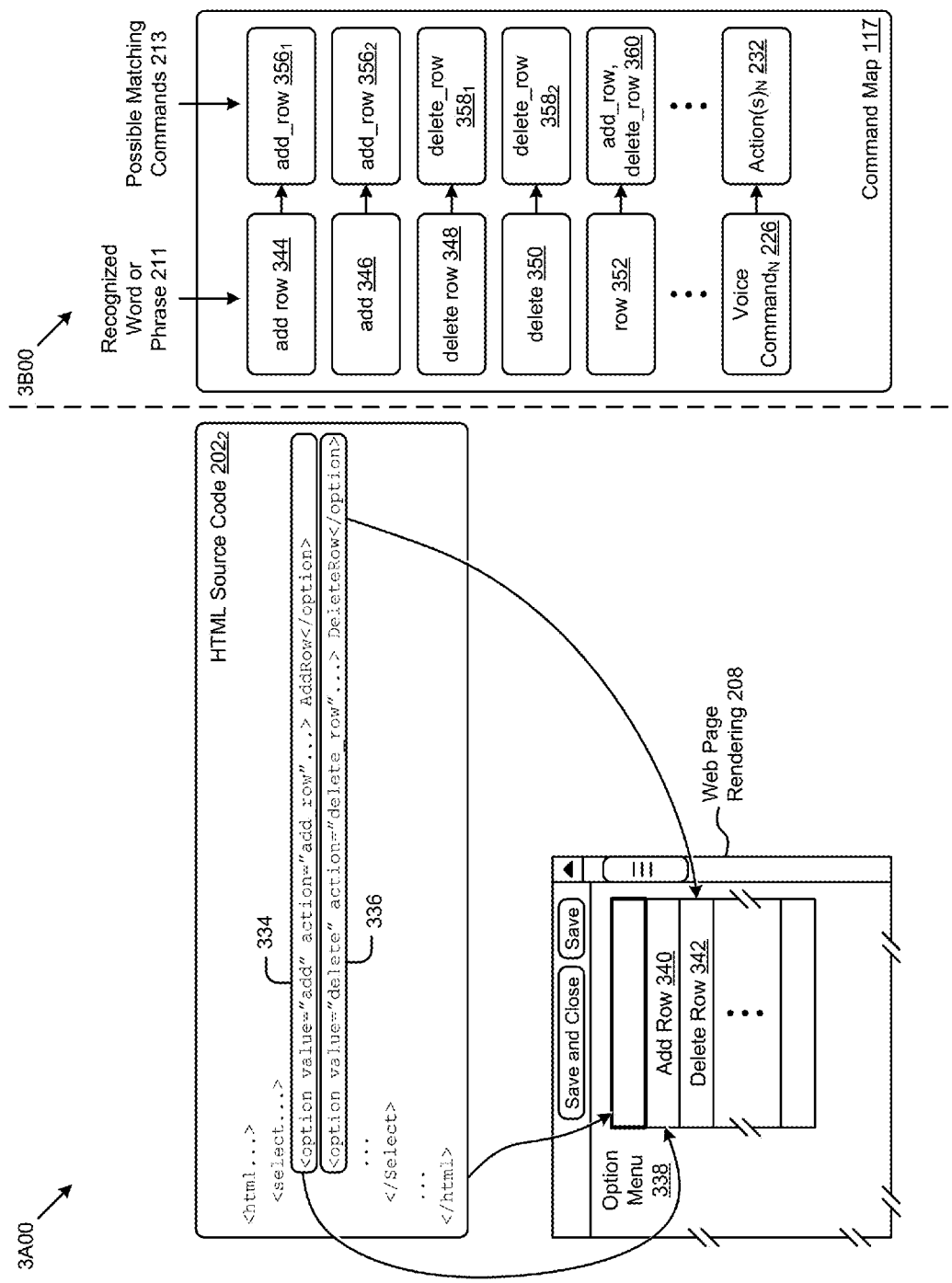

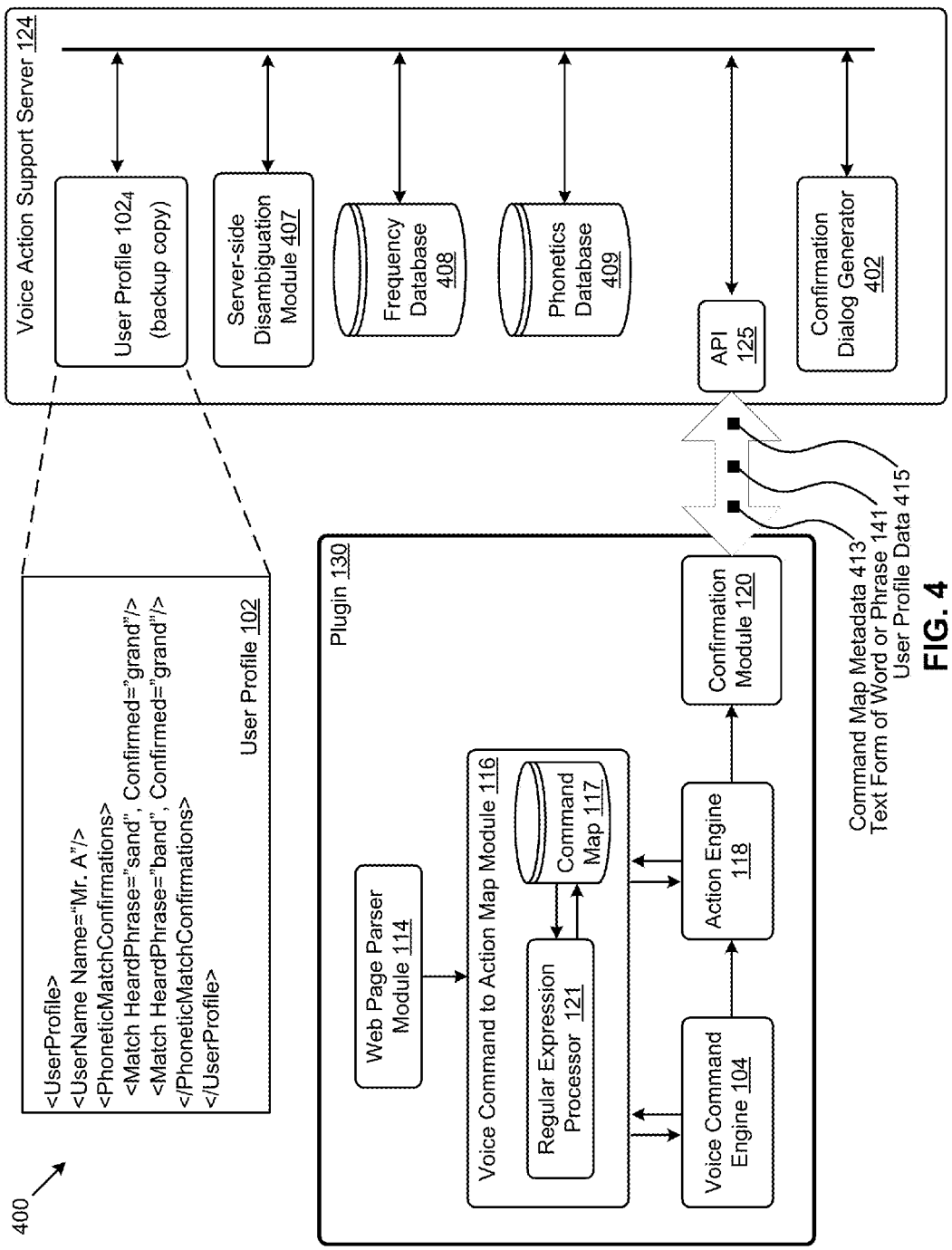

VOICE RECOGNITION OF COMMANDS EXTRACTED FROM USER INTERFACE SCREEN DEVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of human interface design and more particularly to techniques for voice recognition of commands extracted from a user interface description.

BACKGROUND

Users have become accustomed to interacting with software applications through the use of a keyboard and pointing devices. And software application developers have become accustomed to providing screen devices (e.g., HTML widgets such as text boxes, dropdown menus, and buttons) to suggest possible actions a user can take, and/or commands a user can issue when interacting with the application with such devices as a keyboard and mouse.

In many cases, it might be more convenient for a user to interact using voice input such as by using spoken application commands (e.g., "SAVE") and/or spoken selections (e.g., "CHOOSE MENU ITEM THREE") and/or spoken navigation commands (e.g., "NEXT PAGE"). It is desired to offer the flexibility for a user to choose to use a keyboard and/or a pointing device to issue commands, and/or for the user to choose to issue voice commands. Such flexibility would improve the user interface and would provide a more user friendly experience. This is especially true in an enterprise setting or similar contexts where, for example, a user can navigate between different work areas comprising a suite of enterprise applications by merely uttering a navigation command (e.g., GO BACK", or CANCEL).

Unfortunately, automatic speech recognition has long been plagued with problems such as recognition failures resulting from (1) speaker dependence, (2) difficulties in disambiguation between similar sounding words, (3) recognition of not-so-common or domain-specific terms, and (4) a myriad real-time issues when performing recognition and disambiguation.

Legacy approaches have attempted to use word and phrase dictionaries in an effort to reduce the severity of such problems. For example, if a speech recognition system were to be used in a hospital, clinic or other medical setting, the speech recognition system might include a dictionary of medical terms (e.g., terms of anatomy, names of therapies, names of prescription drugs, etc.). This legacy approach can improve over speech recognition systems that do not use a dictionary, nevertheless, domain-specific dictionaries can comprise tens of thousands of words (or more) and often, the extent (e.g., number of words) of the dictionary works against the desire to provide real-time speech recognition. If it could be predicted what a user is going to say (e.g., what words or phrases the user is likely to utter) then it might be possible to provide a smaller dictionary.

Other legacy approaches rely on pre-coding indications and corresponding aspects of voice-enabled commands into the user interface code (e.g., using V-HTML) in a timeframe prior to delivery of the interface page(s) to a user terminal (e.g., during development of the interface page). Such reliance on pre-coding voice commands has several drawbacks that need to be overcome. For example, pre-coding voice commands force the developer to pre-determine which commands are to be enabled for voice control (e.g., when using a browser), and how they are to be enabled. This restriction relies too heavily on the developer, and fails in many practical situations, such as when a user interface page is dynamically-created (e.g., by a content management system). A further drawback of legacy approaches is that voice-enabled browsers require the user to utter a keyword prior to a command utterance in order for the browser to distinguish between on pre-coded, page-specific voice commands (e.g., as may be present in the currently-displayed web page) from built-in browser-specific commands such a "BACK" or "RELOAD". Verbal commands such as "COMPUTER, RELOAD" are cumbersome to users.

What is needed is an efficient and effective way to create a dictionary for enabling voice control of user interface pages of an application "on the fly", wherein a text form of the command is rendered in the displayed portion of the interface page. None of the aforementioned legacy approaches achieve the capabilities of the herein-disclosed techniques for voice recognition of commands extracted-on-the-fly (e.g., from a user interface description). Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for voice recognition of commands extracted from a user interface description.

In some embodiments, an approach is provided to generate a dictionary for enabling voice control of an application on the fly. The dictionary comprises a set of words and phrases that are likely to be uttered by a user in lieu of using keyboard-entered and/or mouse-entered commands. In some embodiments, the dictionary comprises a list of extracted-on-the-fly commands that are the set of possible commands that in turn correspond to the set of action commands and/or navigation commands available at that moment in time. The extracted-on-the-fly commands comprise commands that are extracted from the page being displayed at that moment in time, and offer an improvement over voice recognition of words and phrases that are merely browser commands such as "BACK" or "RELOAD".

Embodiments proceed upon receiving a markup language description of a user interface page (e.g., an HTML page), then, without modifying the received markup language description, parsing the markup language description to identify user interface objects configured to perform an operation responsive to a keyboard or mouse or pointing device. One or more mapping techniques serve to relate the parsed-out operation(s) to one or more voice commands. In some embodiments, the parser recognizes interface objects in various forms such as a button, a textbox, a checkbox, an option menu, or any actionable component. In exemplary cases, the actionable component parsed from the user interface code has at least some displayable aspect (e.g., a button label, an option menu item, etc.) that is displayed when rendering the actionable component and the displayable aspect is mapped to an action (e.g., in the form of a voice command). After receiving a user utterance (e.g., as spoken by a user), the utterance is converted into a text representation which in turn is mapped to one of the voice commands.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 2A depicts a button command extraction technique as used in systems that implement voice recognition of commands extracted from a user interface description, according to some embodiments.

FIG. 2B depicts a sample button command mapping as used in systems that implement voice recognition of commands extracted from a user interface description, according to some embodiments.

FIG. 3A depicts a technique for drop-down menu command extraction as used in systems that implement voice recognition of commands extracted from a user interface description, according to some embodiments.

FIG. 3B depicts a sample drop-down menu command mapping as used in systems that implement voice recognition of commands extracted from a user interface description, according to some embodiments.

FIG. 4 presents an architecture for server-side command disambiguation support as used in a client-server model for implementing voice recognition of commands extracted from a user interface description, according to some embodiments.

DETAILED DESCRIPTION

Figure 1A:
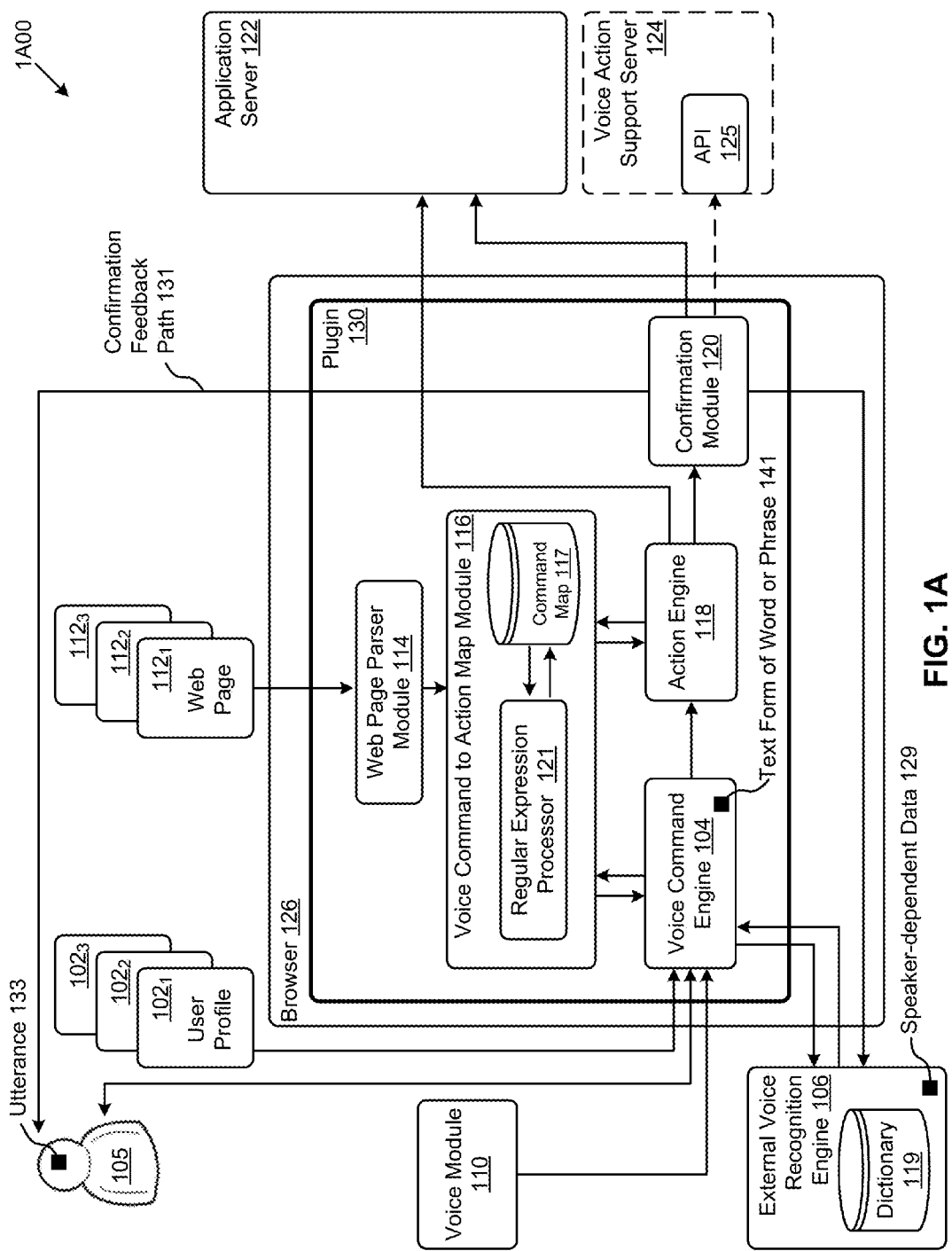
FIG. 1A depicts an environment for practicing voice recognition of commands extracted from a user interface description, according to some embodiments.

Disclosed herein and in the accompanying figures are exemplary environments, methods, and systems for voice recognition of commands extracted from a user interface description.

Overview

Automatic speech recognition has long been plagued with problems such as speaker dependence, disambiguation between similar-sounding words, recognition of not-so-common or domain-specific terms, and myriad real-time issues when performing disambiguation. Legacy approaches have applied dictionary techniques to reduce the severity of such problems. For example, if a speech recognition system were to be used in a hospital, clinic or other medical setting, the speech recognition system might include a dictionary of medical terms (e.g., terms of anatomy, names of therapies, names of prescription drugs, etc.). This legacy approach can improve over speech recognition systems that do not use a dictionary, nevertheless, domain-specific dictionaries can comprise tens of thousands of words (or more) and often the extent (e.g., number of words) of the dictionary works against the desire to provide real-time speech recognition. If it could be predicted what a user is going to say (e.g., what words or phrases the user is likely to utter) then it might be possible to provide a smaller dictionary.

What is needed is an efficient and effective way to "on the fly" create from interface pages of an application, a dictionary for enabling voice commands (in lieu of using keyboard or mouse commands).

When interacting with a software application (e.g., an enterprise software application) a user can interact with the application user interface by providing application-specific commands (e.g., "SAVE") and/or by providing application-specific selections (e.g., "CHOOSE MENU ITEM THREE") and/or by issuing context-sensitive navigation commands (e.g., "NEXT PAGE"). In accordance with the disclosure herein, the user has the option to perform these actions using a keyboard and mouse, or by using voice commands. Indeed, in operating full-featured enterprise applications, many pages (e.g., web pages) might be presented by such an enterprise application. Navigating through and clicking through commands of an application can be time consuming, and/or can be merely inconvenient in situations where the user/operator cannot easily use a keyboard and/or mouse (see examples, below). Using the embodiments disclosed herein, and using the low error-rate of speech recognition techniques as is provided by this disclosure, the user can easily navigate through multiple pages, and can easily perform any action defined on the page using only voice commands. This capability has far-reaching effects, and can greatly enhance day day-to-day workflows. As examples:

While working on a piece of equipment, a service engineer might want to locate a drawing for the piece of equipment without having to touch the computer keyboard or mouse or tablet screen.

While driving a fork lift, the driver can check "What's next" for him in his work queue.

Such capabilities also facilitate workflow in a back-office setting. Strictly as an illustrative example, a user can launch (for example) a project management tool, and then speak, "EXPENSES WORK AREA". The project management tool would then navigate (e.g., switch pages or switch tabs) to the "expenses work area". This can be done without any user clicks. Moreover, and as disclosed hereunder, support for spoken commands can be created dynamically, beginning as soon as an application page has been brought to the client's terminal device. A new application page being brought to the client's terminal device invokes a process to analyze the newly-received page and create a dictionary comprising a set of words and phrases that are likely to be uttered by the user in lieu of using keyboard or mouse commands.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 1A00 for practicing voice recognition of commands extracted from a user interface description. As an option, one or more instances of environment 1A00 or any aspect thereof may be implemented in the context of the architecture and functionality of the embodiments described herein. Also, the environment 1A00 or any aspect thereof may be implemented in any desired environment.

The embodiment as shown in FIG. 1A, user interface display component (e.g., browser 126) is configured to interact with any web pages or other display screens from any enterprise applications. As shown, a web page browser (e.g., browser 126) includes a browser component (e.g., plugin 130) that interacts with an incoming web page (e.g., web page $112_1$, web page $112_2$, web page $112_3$, etc.) via a user's uttered commands as picked up by a microphone or other transducer and/or signal processor (e.g., voice module 110). The aforementioned components serve to: (1) capture a user's utterances (e.g., utterance 133) for mapping to actions and/or commands, and/or confirmations, and (2) execute or cause execution of actions based on the user's voice utterances after mapping to the intended actions, possibly after a confirmation step. Such interactions between a user 105 and the components within environment 1A00 can be performed for any web page that can be received by the browser. Moreover, such interactions can be applied iteratively such that any web applications that use web pages can be controlled, at least in part, by a user's voice commands.

As shown, the plugin 130 includes a parser module 114, which serves to receive a markup language description of a page (e.g., a web page) and to parse out commands so as to achieve voice enabling of any received markup-language description. The parser is able to receive a markup language description of a page, and identify portions of the markup language description corresponding to actions on the page that are configured to respond to a user using a keyboard and/or mouse. The parser can provide inputs to a mapping module (e.g., voice command to action map module 116, and command map 117) which in turn is able to map any actionable items on a web page into words or phrases that can be spoken. When a spoken word or phrase is initially recognized (e.g., using an external voice recognition engine 106), the word or phrase is mapped to a command, and an action processor (e.g., action engine 118) attempts to confirm the user's intent to issue the command. In some cases a confirmation of the user's intended action is confirmed (e.g., using a confirmation module 120), where the user is consulted for additional voice input before issuing the command to the application that served the subject web page.

The aforementioned voice command can be processed on a client computer that hosts a user interface capability (e.g., the browser 126 and plugin 130, as shown). The aforementioned client computer can be a mobile device (e.g., a smart phone, tablet, etc.), and the aforementioned interface capability can comprise any application configured to operate on a computing platform (e.g., client computer, mobile device, etc.). In some cases a computing platform can host an interface capability that is configured to run natively on the computing platform, and any forms of user interface can use native code (e.g., instead of or in combination with using HTML and/or other browser-processed code).

In some cases, additional computing resources may be accessible to the computing platform, for example from a configured support server (e.g., voice action support server 124), or from any other server (e.g., the application server 122). Certain features and functions as are disclosed herein are discussed as pertaining to embodiments that use computing resources accessible over a network link. Specific functions that can be performed by computing resources accessible over a network link may use a particular protocol, portions of which protocol can be implemented in an application programming interface (e.g., API 125). Certain features of such computing resources accessible over a network link and certain features of such an application programming interface are discussed as pertaining to FIG. 4.

Returning to the discussion of plugin 130, the plugin includes a voice command engine 104 that is configured to interface with an external voice recognition engine 106. For example, the voice command engine 104 can preprocess voice commands with respect to a particular user before sending the preprocessed utterance to the external voice recognition engine 106. More specifically, voice command engine 104 can receive a user's utterance (e.g., via the voice module 110) and apply a shaped filter to the utterances. The foregoing preprocessing is merely an example, and other preprocessing operations can be performed against an utterance using a particular user's profile (e.g., user profile $102_1$, user profile $102_2$, user profile $102_3$, etc.). In some cases, preprocessing includes tagging an utterance with identifying and/or characterizing information as may be consistent or required by dictionary 119.

Still discussing plugin 130, the plugin includes a voice command engine 104 that is configured to interface with a regular expression processor 121. In exemplary embodiments, the voice command engine 104 sends preprocessed utterances to the external voice recognition engine 106, and upon receipt of recognized words or phrases (e.g., text form of a word or phrase 141) from the external voice recognition engine, the regular expression processor 121 attempts to find matches between recognized words or phrases (or portions thereof) and entries in the command map 117. In some cases recognized words or phrases from the external voice recognition engine may form a 100% match with the command map. In other cases only portions of the recognized words or phrases from the external voice recognition engine match with the command map. As such, various search and match algorithms can be used to overcome the imperfections in the initial voice recognition. Multiple post-processing steps as well as multiple iterations of the aforementioned search and match algorithms can be used to achieve a high utterance-to-command hit rate. Strictly as one example, post-processing operations may include mapping certain recognized words or phrases from the external voice recognition engine to a set of corrected and/or confirmed words or phrases. Using a confirmation feedback technique (e.g., using a confirmation module 120 and a confirmation feedback path 131) in conjunction with a user-specific user profile, the foregoing technique can be used to assemble a speaker-dependent set of words or phrases, which in turn can be used within or in conjunction with the command map 117 to confirm and/or to disambiguate. Such feedback techniques and disambiguation techniques can be used singly or in combination in order to achieve a high utterance-to-command hit rate. The user profile can comprise any forms or representations of data, and/or markup of data (e.g., metadata), and/or conform to any markup language constructs.

As can be seen from the foregoing, (1) a particular user's user profile can be used to overcome the imperfections in voice pickup and/or the external voice recognition engine, and (2) the plugin does not require any initial user training although it can be trained based on results of the confirmation module 120.

The applications running on application server 122 need not be aware of the existence of and/or operations of the plugin. The plugin components (e.g., web page parser module 114) can process any web page served by the application(s) such that the applications can use any forms of browser-recognized graphical user interface (GUI) objects. Some of such GUI objects are presently discussed.

Figure 1B:
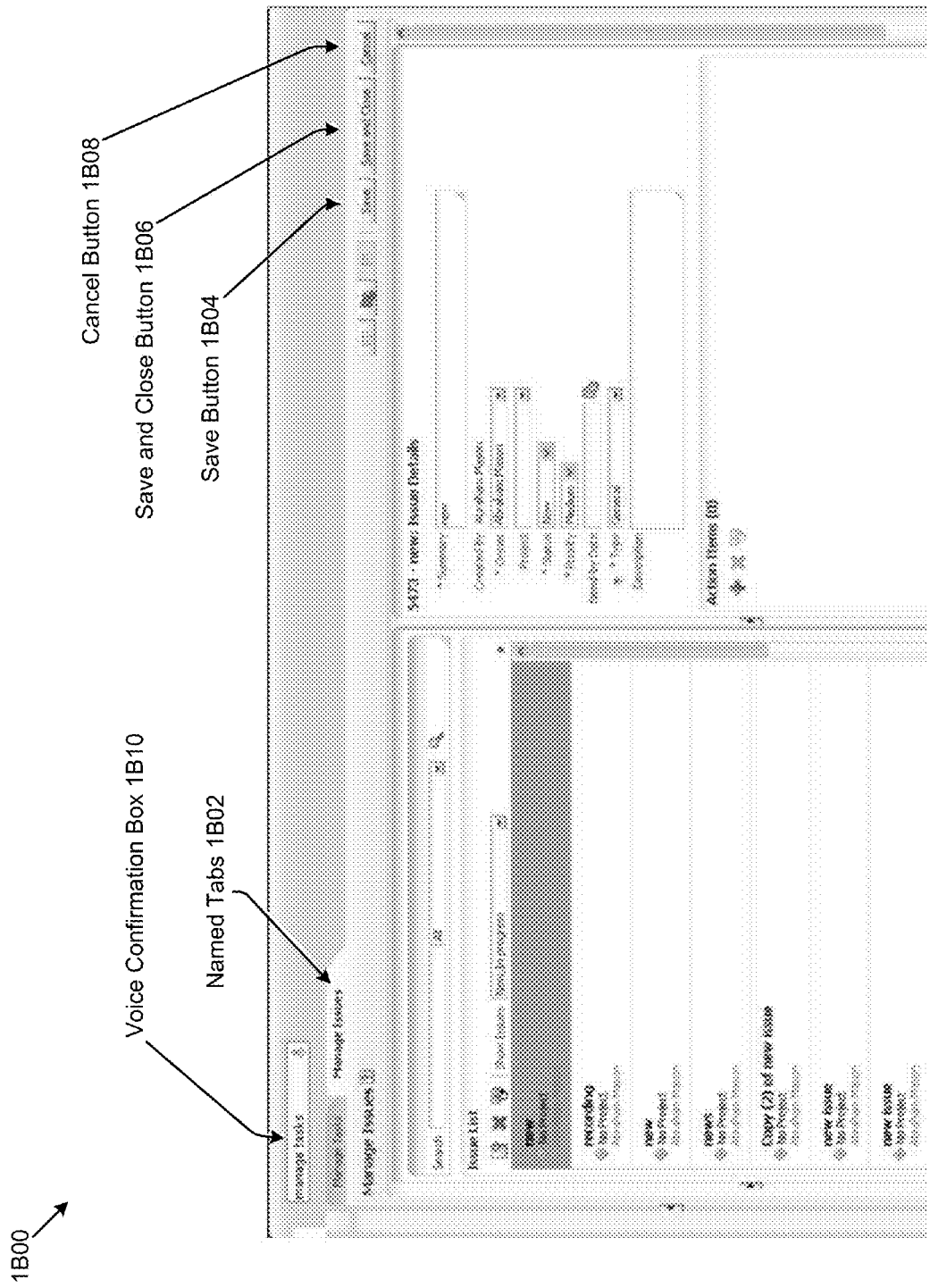
FIG. 1B exemplifies a client-side application GUI that supports voice recognition of commands extracted from a user interface description, according to some embodiments.

FIG. 1B exemplifies a client-side application GUI 1B00 that supports voice recognition of commands extracted from a user interface description. As an option, one or more instances of client-side application GUI 1B00 or any aspect thereof may be implemented in the context of the architecture and functionality of the embodiments described herein. Also, the client-side application GUI 1B00 or any aspect thereof may be implemented in any desired environment.

The GUI objects shown in FIG. 1B are exemplary and illustrative. Other forms or appearances of a given interface object is possible. Instances of a web page parser module and other components of the plugin can be configured to recognize user-interaction objects in any format and/or for any representation (e.g., a button, a textbox, a checkbox, a radio button, a clickable tab etc.). The shown client-side application GUI 1B00 comprises named tabs 1B02, and a set of command widgets in the form of buttons (e.g., a save button 1B04, a save and close button 1B06, and a cancel button 1B08). Additionally, a voice confirmation box 1B10 is provided.

As earlier indicated, an instance of a web page parser module can parse any forms of browser-recognized GUI objects. Referring to the GUI objects as shown in FIG. 1B, the GUI code (e.g., HTML, CSS, other user interface description code) for the named tabs can be processed to extract navigation commands, namely, the names of the named tabs (e.g., "Manage Issues" and "Manage Tasks"). The names are extracted and saved into command map 117, which commands are used for navigation between tabs.

Still referring to the GUI objects as shown in FIG. 1B, the user interface description code may comprise buttons, which button code contains names of commands. The names are extracted and saved into a command map 117, which names are used by the voice command to action map module 116 to initiate the action corresponding to the action as would be initiated had the button been clicked by use of a keyboard and/or mouse.

In some cases, voice recognition is persistently enabled. In other cases voice recognition is enabled under user control, for example when the user places a cursor in or over the voice confirmation box. Steps taken by in systems implementing voice recognition of commands extracted from a user interface description can be initiated with an enabled voice command. Some of such steps are discussed as pertaining to the following FIG. 1C.

Figure 1C:
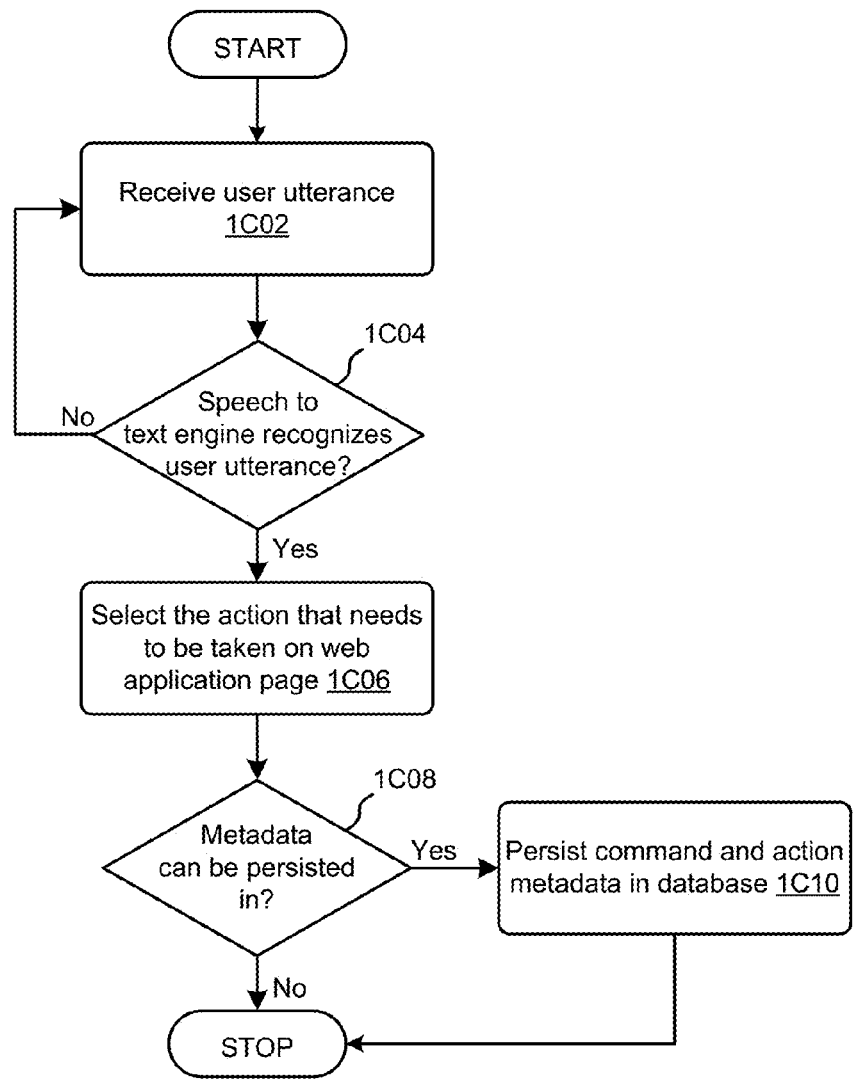
FIG. 1C depicts a metadata storage flow as used in systems implementing voice recognition of commands extracted from a user interface description, according to some embodiments.

FIG. 1C depicts a metadata storage flow 1C00 as used in systems implementing voice recognition of commands extracted from a user interface description. As an option, one or more instances of metadata storage flow 1C00 or any aspect thereof may be implemented in the context of the architecture and functionality of the embodiments described herein. Also, the metadata storage flow 1C00 or any aspect thereof may be implemented in any desired environment.

As previously introduced in the discussion of FIG. 1A, a user profile can comprise metadata. Such metadata can be generated in the course of operation of the system, and such metadata can be persisted for later use. The quality of metadata can be confirmed prior to taking steps to persist the metadata.

As shown, the metadata storage flow 1C00 commences when a user speaks while voice recognition is enabled (see operation 1C02). A recognition and match of the spoken words are attempted (e.g., using the techniques described in FIG. 1A and elsewhere herein) and if there is a match (see operation 1C04), then the flow moves to selecting an action to be taken (see operation 1C06). Otherwise, if it is deemed that there is no match, then the flow loops back (see path to operation 1C02), and the user is prompted to speak a command again.

In operations to select the action to be taken on the web page (see operation 1C06) any recognition and mapping techniques can be used. If the recognition and mapping is sufficiently strong (e.g., high statistical confidence score, or higher strength of recognition and mapping as compared to a threshold), then one or more tests are applied (see decision 1C08) to determine if the metadata pertaining to the spoken command should be persisted for this user (see operation 1C10). If the spoken command is persisted for this user, the metadata can be re-used in this session and for other sessions.

Metadata can be conceived to store any sorts of information that would assist in voice recognition of commands extracted from a user interface description. For example, in some embodiments, an application form is identified uniquely with an identifier, and a single command might take on different meanings in different forms. In other situations such as are described herein, a command map can be represented as metadata (e.g., in a markup language) and/or can be represented using a hash map or other convenient data structure. Uses of metadata can be applied in the formation of a user profile. For example, a user profile might comprise metadata to codify a list of recognized words as received from an external voice recognition engine and/or might comprise metadata for representing words corresponding to phonetically-similar words.

As shown, the metadata storage flow 1C00 uses user-specific profiles, which in turn facilitates user-specific personalization of commands for different forms. Such persisted metadata can be retrieved and used in the same session or in a subsequent session.

Figure 1D:
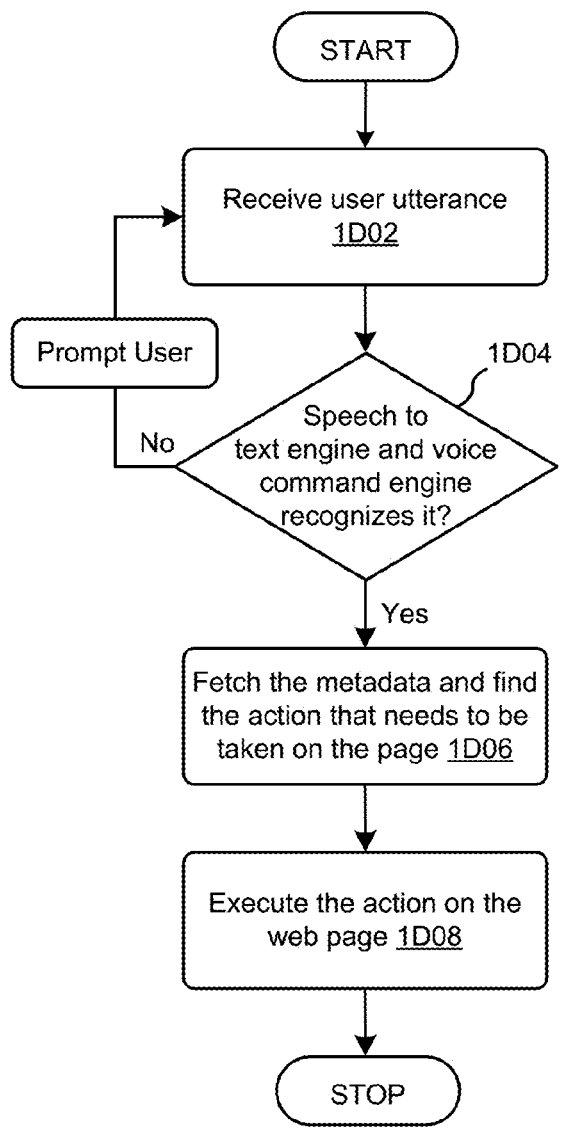
FIG. 1D depicts a metadata retrieval and usage flow as used in systems implementing voice recognition of commands extracted from a user interface description, according to some embodiments.

FIG. 1D depicts a metadata retrieval and usage flow 1D00 as used in systems implementing voice recognition of commands extracted from a user interface description. As an option, one or more instances of metadata retrieval and usage flow 1D00 or any aspect thereof may be implemented in the context of the architecture and functionality of the embodiments described herein. Also, the metadata retrieval and usage flow 1D00 or any aspect thereof may be implemented in any desired environment.

As discussed as pertaining to FIG. 1C, metadata can be stored after recognition and mapping is sufficiently strong (e.g., high statistical confidence score, or higher strength of recognition and mapping as compared to a threshold). Once a confidence level has been reached, that is, once the system has stored metadata pertaining to a match of the user's utterance to a command, it may be unnecessary to repeatedly reconfirm the match between the user's utterance and a corresponding command. As shown in FIG. 1D, when an utterance (e.g., a voice command) is picked up by the voice module 110, then the voice command engine 104 commences processing based on the context (e.g., the uniquely-identified form) where the user has uttered the command. The metadata is picked up from the user's profile or other database. The metadata is then parsed to map the corresponding action and the action is executed in the web page.

The foregoing flow, namely the metadata retrieval and usage flow 1D00 commences when a user speaks a command while voice commands are enabled (see operation 1D02). Then decision 1D04 is entered. If the external voice recognition engine 106 recognizes the utterance, then processing proceeds to operation 1D06. If the decision 1D04 is entered, and if the external voice recognition engine 106 did not recognize the utterance, then processing returns to operation 1D02, and the user is prompted to try again.

Now, if metadata had been persisted (e.g., see operation 1C10 of metadata storage flow 1C00), then the system con correspond to the recognized utterance with the previously confirmed action, and the action can be taken forthwith (see operation 1D08). The combination of metadata storage flow 1C00 and metadata retrieval and usage flow 1D00 serve to achieve a high utterance to command hit rate.

Further techniques can be employed to achieve a high utterance to command hit rate even when a web page comprises user interface components (e.g., buttons, menus, tabs, etc.) for which spoken actions (or portions of spoken actions) can be deemed as ambiguous. Certain possibly ambiguous cases are addressed using attendant techniques, as is shown and discussed in the following figures (see buttons in FIG. 2A and FIG. 2B below, and see menus in FIG. 3A and FIG. 3B, below).

FIG. 2A depicts a button command extraction technique 2A00 as used in systems that implement voice recognition of commands extracted from a user interface description. As an option, one or more instances of button command extraction technique 2A00 or any aspect thereof may be implemented in the context of the architecture and functionality of the embodiments described herein.

The button command extraction technique of FIG. 2A accepts GUI code (e.g., HTML source code $202_1$) or other user interface description code and parses it to identify GUI components (e.g., HTML widgets) that are associated with an action. In exemplary cases the rendering of the component includes a visualization of words or phrases that can be associated with an action, and the words or phrases can be spoken by the user to signal the user's desire to take the corresponding action. For example, HTML source code $202_1$ includes button components (e.g., save button component 206 and save and close button component 204). The button components are rendered in a web page rendering 208 as visible components (e.g., see the save button 212 and see the save and close button 210).

A web page parser module 114 identifies the identify GUI components (e.g., HTML widgets) that are associated with an action and constructs and/or adds entries to command map 117. The details of operations of the web page parser module 114 in parsing GUI components and generating a command map 117 are presently discussed.

FIG. 2B depicts a sample button command mapping 2B00 as used in systems that implement voice recognition of commands extracted from a user interface description. As an option, one or more instances of button command mapping 2B00 or any aspect thereof may be implemented in the context of the architecture and functionality of the embodiments described herein. Also, the button command mapping 2B00 or any aspect thereof may be implemented in any desired environment.

As shown in FIG. 2B, the command map 117 serves to map a recognized word or phrase 211 to one or more possible matching commands 213. Following the example of FIG. 2A, the buttons provide words or phrases that are likely to be uttered, which in turn are expected to be returned from the external voice recognition engine 106, which can then be used in conjunction with the command map by finding an entry in the command map that corresponds to the words or phrases returned from the external voice recognition engine. In some cases, a word or phrase from a particular button might contain words or phrases that overlap with other buttons. For example, the phrase "save" from the save button component 206 contains the word "save", which overlaps with the phrase "save and close" from the save and close button component 204. In dealing with such a situation, entries in the command map 117 can comprise any/all combinations of words and/or words and components phrases. In the shown example, both the phrase "save and close" as well as its word-level components "save", "and", and "close" are entered into the command map, and each entry has a corresponding mapped-to set of possible matching commands. Continuing this example, the recognized word "save" is mapped to two commands, namely the action named "save" and the action named "save and close". The shown example of command map of FIG. 2B is as follows:

TABLE 1

Command map example-Buttons

| Recognized Word or Phrase | Possible Matching Commands |
|---|---|
| "Save" 218 | "Save" or "Save and Close" 228 |
| "Save and Close" 220 | "Save and Close" $230_1$ |
| "and" 222 | "Save and Close" $230_2$ |
| "Close" 224 | "Save and Close" $230_3$ |
| Voice Command$_N$ 226 | Action(s)$_N$ 232 |

FIG. 3A depicts a technique for drop-down menu command extraction 3A00 as used in systems that implement voice recognition of commands extracted from a user interface description. As an option, one or more instances of drop-down menu command extraction 3A00 or any aspect thereof may be implemented in the context of the architecture and functionality of the embodiments described herein.

The drop-down menu command extraction technique of FIG. 3A accepts GUI code (e.g., HTML source code $202_2$) or other user interface description code, and parses it to identify GUI components (e.g., HTML widgets) that are associated with an action. In exemplary cases the rendering of the component includes a visualization of words or phrases that can be associated with an action, and the words or phrases can be spoken by the user to signal the user's desire to take the corresponding action. For example, HTML source code $202_2$ includes drop-down menu components (e.g., first option component 334 and a second menu option component 336). The drop-down menu with its option components are rendered in a web page rendering 208 as visible components (e.g., see the options of the option menu 338).

FIG. 3B depicts a sample drop-down menu command mapping 3B00 as used in systems that implement voice recognition of commands extracted from a user interface description. As an option, one or more instances of drop-down menu command mapping 3B00 or any aspect thereof may be implemented in the context of the architecture and functionality of the embodiments described herein.

As shown in FIG. 3B, the command map 117 serves to map a recognized word or phrase 211 to one or more possible matching commands 213. Following the example of FIG. 3A, the options of the option menu (e.g., option "Add row" 340, option "Delete row" 342) provide words or phrases that are likely to be uttered, which in turn are expected to be returned from the external voice recognition engine 106, which can then be used in conjunction with the command map by finding an entry in the command map that corresponds to the words or phrases returned from the external voice recognition engine. In some cases, a word or phrase from a particular option of an option menu might contain words or phrases that overlap with other options. For example, the phrase "add row" from the first option component 334 contains the word "row", which overlaps with the word "row" from the second menu option component 336. In dealing with such a situation, entries in the command map 117 can comprise any/all combinations of words and/or words and component phrases. In the shown example, both the phrase "add row" as well as its word-level components "add", "and", and "row" are entered into the command map, and each entry has a corresponding mapped-to set of possible matching commands. Continuing this example, the recognized word "row" is mapped to two commands, namely the action named "delete row" and the action named "add row". Resolving ambiguities that can occur resulting from having multiple possible matching commands in the command map 117 is discussed as pertaining to FIG. 5.

The shown example of the command map of FIG. 3B is as follows:

TABLE 2

Command map example-Option Menu

| Recognized Word or Phrase | Possible Matching Commands |
|---|---|
| "add row" 344 | "add_row" $356_1$ |
| "add" 346 | "add_row" $356_2$ |
| "delete row" 348 | "delete_row" $358_1$ |
| "delete" 350 | "delete_row" $358_2$ |
| "row" 352 | "add_row, delete_row" 360 |

FIG. 4 presents an architecture for server-side command disambiguation support 400 as used in a client-server model for implementing voice recognition of commands extracted from a user interface description. As an option, one or more instances of server-side command disambiguation support 400 or any aspect thereof may be implemented in the context of the architecture and functionality of the embodiments described herein. Also, the server-side command disambiguation support 400 or any aspect thereof may be implemented in any desired environment.

As earlier indicated, various feedback techniques and disambiguation techniques can be used singly or in combination in order to achieve a high utterance-to-command hit rate. Within an architecture for server-side command disambiguation of utterances and/or mapping to commands extracted from a user interface description, a voice action support server 124 can be configured with a server-side disambiguation module 407. A server-side disambiguation module may in turn access data to tally occurrences of words and/or phrases and/or commands that have been encountered and/or confirmed (e.g., see frequency database 408).

The partitioning shown in FIG. 4 (e.g., partitioning containing plugin 130 separate from the partition of the voice action support server 124) is merely illustrative, and other partitions are possible. Irrespective of partitioning, some forms of disambiguation rely on a conversion of a regular expression to an actionable component on the web page based on an utterance and/or based on words or phrases returned from the external voice recognition engine. More specifically, a voice command to action map module 116 may comprise a regular expression processor 121. The regular expression processor can receive utterances and/or words or phrases returned from the external voice recognition engine (e.g., from the voice command engine 104), and the regular expression processor has access to the command map.

The data organization in the command map may be structured in a manner to facilitate access by the regular expression processor 121. In one embodiment, the command map is structured as a hash map data structure that serves to store a relationship or multiple relationships between a word or phrase to one or more operations. A hash map can store entries such as relationships or mappings in the form of <label, component IDs>. Also, such a hash map can store entries such as <exact label, component IDs> mapping, as well as a mapping such as <component ID, word> and/or <component ID, phrase>.

In exemplary cases, a hash map such as described in the foregoing paragraphs can be built when the page is initially received (e.g., by the plugin 130) and building of such a hash map can be delayed until the moment when the page is enabled for voice navigation. The hash map data structure can comprise still further information about all actionable content on the page. Random accesses to a hash map data structure are retrieved in the order O(1) (near constant time) irrespective of the number of entries in the hash map data structure.

As earlier indicated, entries in a command map can be generated upon each receipt of a new page. The event of a new page can be detected by calculating a checksum of the string of the URL referring to the current URL. If the checksum differs, then the command map is generated anew.

Once the command map is built, operations to identify and disambiguate a voice command can fall into several cases:

Case 1: The words or phrases from the external voice recognition engine has an exact match in the command map. In this case, the search returns "success".

Case 2: There is no exact match found in the command map. This case triggers an additional search of the command map to identify individual components that are in association with the words or phrases from the external voice recognition engine. If there is an intersecting pattern covering two or more commands, then choices are provided to the user (e.g., see dynamically-generated disambiguation dialog of FIG. 5).

Case 3: There is still no match even for the individual components of the obtained string. In this case a phonetic search is performed (e.g., using phonetics database 409) to identify most frequently used similar sounding words (e.g., using frequency database 408). In this case further processing may be performed, possibly consulting with voice command engine 104 and/or consulting with this user's profile, and/or possibly consulting with a voice action support server 124.

In cases or situations when the voice action support server 124 is consulted (e.g., to resolve ambiguity), the plugin 130 comports with the specifications of API 125. Strictly as one example, the plugin assembles the utterance (e.g., as a text form of a word or phrase 141) together with relevant portions of a user profile (e.g., user profile data 415) and together with relevant portions of command map 117 (e.g., command map metadata 413). In some embodiments, the voice action support server 124 can restrict searching and other processing to consider only the relevant portions of the command map e.g., to address only the set of command phrases as are present in the current web page). The foregoing cases and other cases are further discussed as pertaining to FIG. 6.

Returning to the discussion of the voice action support server 124, to achieve a high utterance-to-command hit rate, the server is configured to provide the functions as follows:

Secondary user profile storage: Secondary user profiles (e.g., user profile $102_4$) can be stored in a location other than the user's platform, and can server as a backup set of data. For example, a secondary user profile can be stored within a support server. Over time, a list of words and phrases corresponding to phonetic words that are particular to the user are assembled (see further details as shown and discussed as pertaining to FIG. 6). In exemplary embodiments, a secondary user profile comprises any portions of data stored in a user profile, and the data residing in a secondary user profile can be periodically synchronized with the data residing in a user profile residing on the user's platform. When a user profile (e.g., user profile $102_4$) is stored on a user platform, words and phrases corresponding to phonetic words that are particular to the user can be accessed locally (e.g., without needing to perform any accesses to a voice action support server 124).

Phonetic search assist: A phonetic dictionary (e.g., phonetics database 409) facilitates a look-up operation where, given a subject word or phrase, a set of similar sounding words or phrases are stored. In some cases the set of similar sounding words or phrases are sorted in decreasing order of their frequency of use (e.g., possibly using frequency database 408). The set of similar sounding words or phrases are can be determined, at least in part by use of algorithms such as "soundex" and/or "metaphone" and/or "double metaphone", etc. Further, frequency can be determined using any know techniques.

The server-side disambiguation module serves to identify one or more statistically reasonable options from a larger set of options. For example, if a user utters the word "grand" but the external voice recognition engine returned the word "sand", then there would not be an exact match (option #1), or even an intersecting match (option #2). Thus, disambiguation (e.g., option #3) is invoked and a phonetic search is performed. Such a phonetic search might return "band" and "grand". Inasmuch as the word "sand" has still not been disambiguated, the user is prompted for his or her selection (e.g., using a confirmation flow and/or a confirmation dialog). Continuing with this example, assume the user selects "grand". In such a case, some embodiments provide the user's selection "grand" to the plugin so as to introduce an entry into the user's profile. The entry reflects that the word "sand" (e.g., as returned from the external voice recognition engine) is this user's pronunciation of "grand". In subsequent utterances, the user utters "grand", yet again, the voice recognition engine wrongly returns "sand". The user's profile now has an entry corresponding to "sand" and a search through the user's profile would be able to retrieve the correct word "grand". A portion of a user profile 102 is given in FIG. 4. Specifically, the shown portion comprises one possibility for codifying a particular user's speaker-dependent speech patterns against known commands. The example is given in XML, however any other representation (e.g., text file, metadata, etc.) can be used. The user's profile that resides on the user's computing platform can be used to reduce the occurrences of or need for server-side disambiguation. Consider the case that the user is in a different page where is no action corresponds to "grand". Now further assume that the user says "brand" and again the voice recognition engine returns the wrong word "sand". At this point an access to the user's profile will retrieve actions (if any) corresponding to "sand". In this example, there are no actions (if any) corresponding to "sand" which would invoke server-side disambiguation.

In the paragraphs above, in particular, the discussion of option #2 mentions a confirmation dialog. Such a confirmation dialog can be dynamically-generated (e.g., using confirmation dialog generator 402) and used in a disambiguation flow. Some such techniques are presently discussed.

Figure 5:
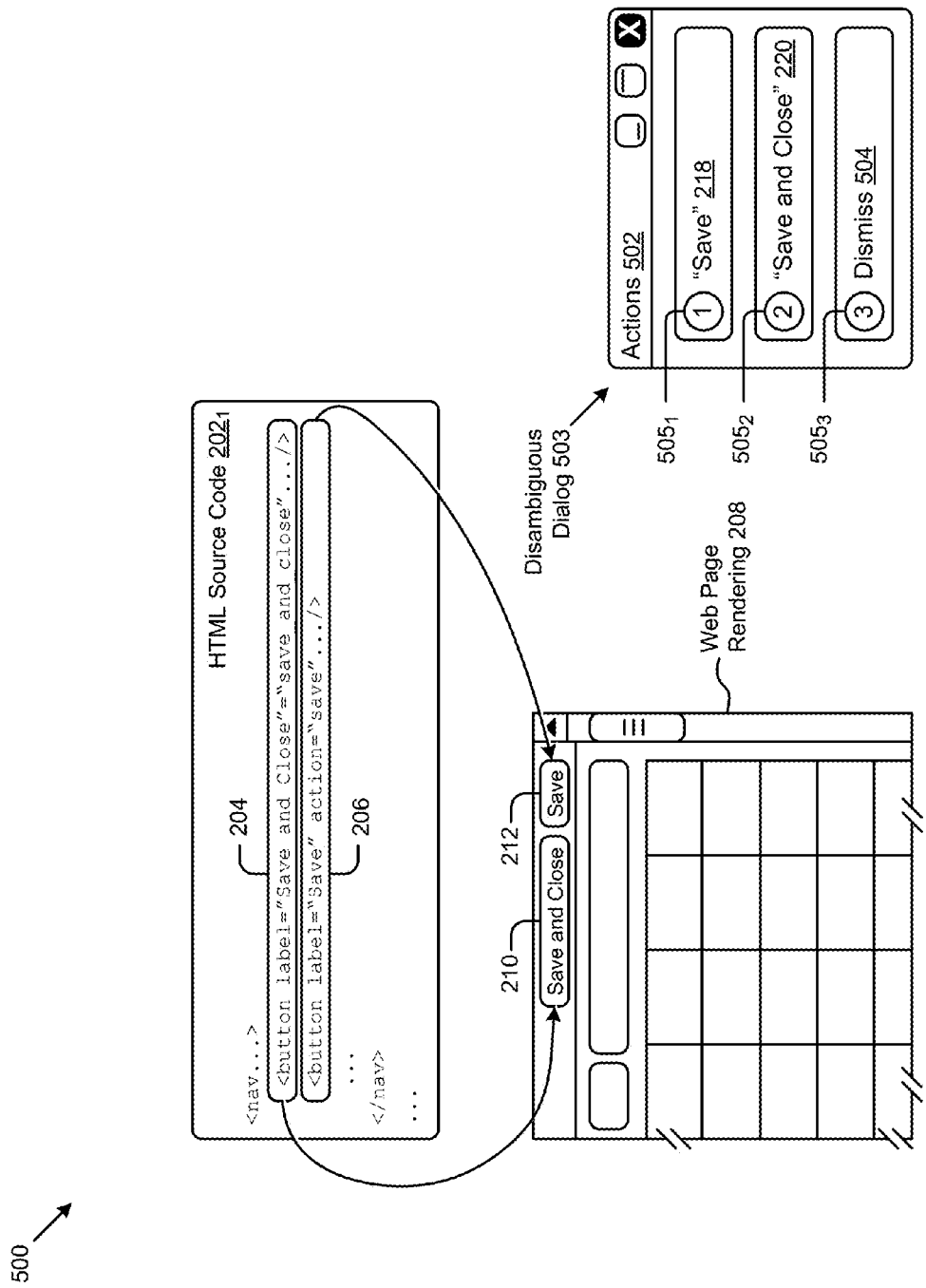
FIG. 5 presents a dynamically-generated disambiguation dialog as used in systems that implement voice recognition of commands extracted from a user interface description, according to some embodiments.

FIG. 5 presents a dynamically-generated disambiguation dialog 500 as used in systems that implement voice recognition of commands extracted from a user interface description. As an option, one or more instances of dynamically-generated disambiguation dialog 500 or any aspect thereof may be implemented in the context of the architecture and functionality of the embodiments described herein. Also, the dynamically-generated disambiguation dialog 500 or any aspect thereof may be implemented in any desired environment.

As shown in FIG. 5, the web page rendering 208 include a save button 212 and a save and close button 210. The word "save" is used in both actions. The user's meaning or intent can be determined unambiguously through use of a disambiguation dialog. In this case the disambiguation dialog display 503 presents a set of candidate actions 502. Each of the candidate actions are presented with an associated disambiguation term and/or icon. In this case, each of the actions presented have a numeric disambiguation term and icon, namely, the icon $505_1$, icon $505_2$, and icon $505_3$ (for action to dismiss 504). The terms and/or icons can be selected so as to suggest to the user a word or phrase to be uttered when interacting with the disambiguation dialog. In this case, the spoken word "one" or "two" or "three" as uttered by the user would provide the needed confirmation feedback. In this case as well as in other exemplary cases, the terms and/or icons are selected so as to suggest a word or phrase that is phonetically dissimilar to the words or phrases to be disambiguated.

Figure 6:
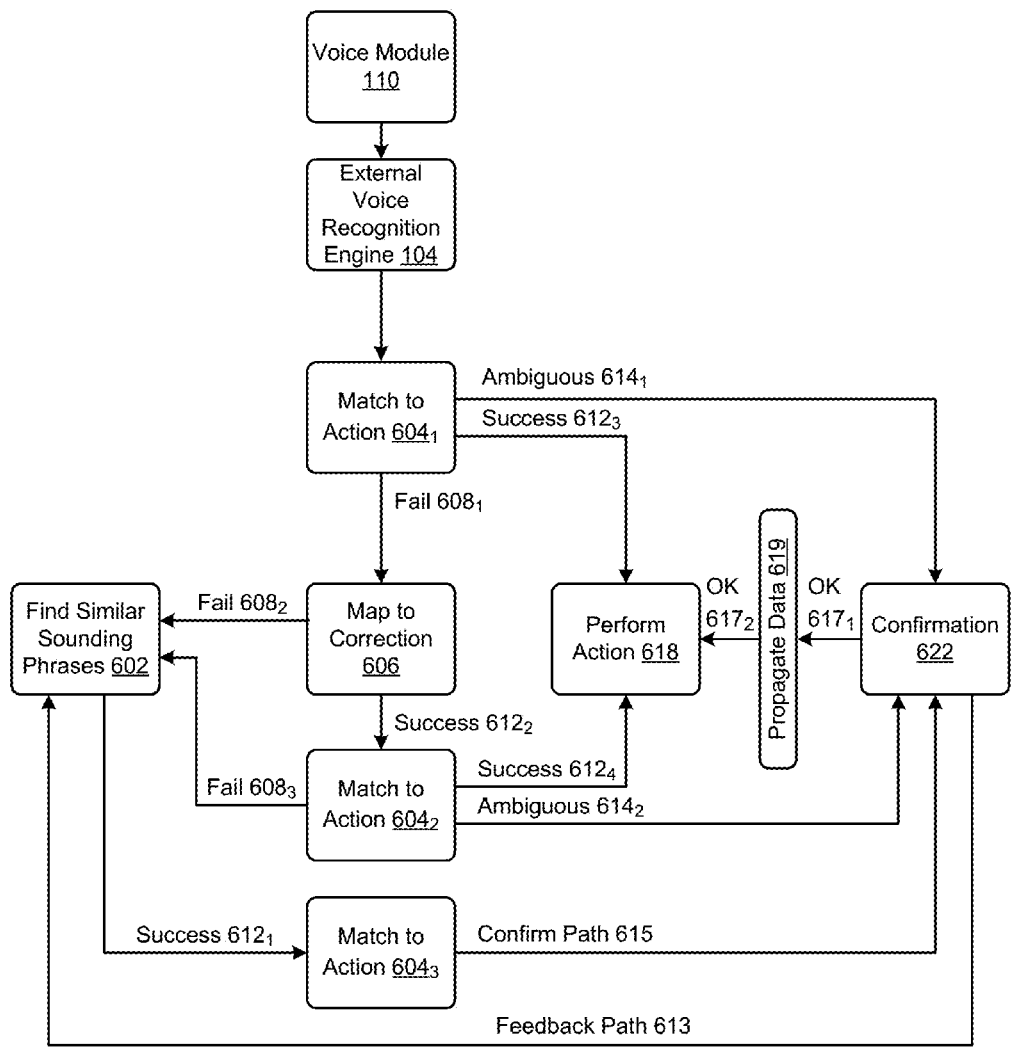
FIG. 6 presents an action confirmation flow as used in systems that implement voice recognition of commands extracted from a user interface description, according to some embodiments.

FIG. 6 presents an action confirmation flow 600 as used in systems that implement voice recognition of commands extracted from a user interface description. As an option, one or more instances of action confirmation flow 600 or any aspect thereof may be implemented in the context of the architecture and functionality of the embodiments described herein.

As presented in the foregoing, there are many techniques to disambiguate and/or confirm a user's intent. Any technique can be used advantageously in combination with any other technique. The action confirmation flow 600 presents one possible set of advantageous combinations.

As shown, the flow commences upon capture of a user's utterance using voice module 110, which then triggers an interchange with the external voice recognition engine 106, which returns text strings corresponding to the user's utterances (e.g., as a text form of a word or phrase 141). If there is a match that is deemed to be unambiguous (e.g., an exact match) then the command is deemed to be recognized, and the success path $612_3$ is taken. The intended action is initiated (e.g., see perform action 618). If the match is a partial match or otherwise deemed to be ambiguous, then ambiguous path $614_1$ is taken, and a confirmation dialog flow is initiated (e.g., see confirmation 622). When the command is deemed to be confirmed by the user, then certain data is propagated and/or persisted, and the intended action is initiated (e.g., see perform action 618). Strictly as an example, when the command is deemed to be confirmed by the user, the OK path $617_1$ is taken. The operation to propagate data 619 is entered and the recognized phrase corresponding to the confirmed command is persisted in the user's local profile. Also, the recognized phrase corresponding to the confirmed command may be propagated to the external voice command engine as training data. Such training data (e.g., speaker-dependent data 129, as shown) can be used by certain external voice command engine implementations to aid in reducing utterance recognition imperfections on a user-by-user basis (e.g., using speaker-dependent recognition). Continuing this case, the OK path $617_2$ is taken and the intended action is initiated (e.g., see perform action 618).

It is possible that in the course of operation of the matching (e.g., see match to action $604_1$) there is neither an exact match nor a partial/ambiguous match. In such as case the fail path $608_1$ is taken. The processing assumes that the wrong word or phrase was returned from the external voice recognition engine, and in such a case, steps are taken to find a correct word (e.g., see map to correction 606). Unless and until the success path $612_2$ can be taken, the fail path $608_2$ is taken, and the flow serves to find similar sounding phrases 602. Such a flow might result in success (see success path $612_1$ and result in a match to action $604_3$). Processing in the match to action $604_2$ step might result in traversing the ambiguous path $614_2$. Or, processing in the match to action $604_2$ step might result in traversing the fail path $608_3$, which might result in still further attempts to match to action $604_2$. Further attempts might include steps to find similar sounding phrases 602, and if a phonetic match is found, then success path $612_1$ is taken and an attempt to match the phonetic term to an action is taken (see operation match to action $604_3$). The operation exits via the confirm path 615 to enter a confirmation dialog (e.g., using a confirmation module). If, the user did not confirm the command (see confirmation 622), then the feedback path 613 is taken. Loops can be repeatedly traversed until either the success path $612_3$ or success path $612_4$ can be taken.

Additional Embodiments of the Disclosure

Figure 7:
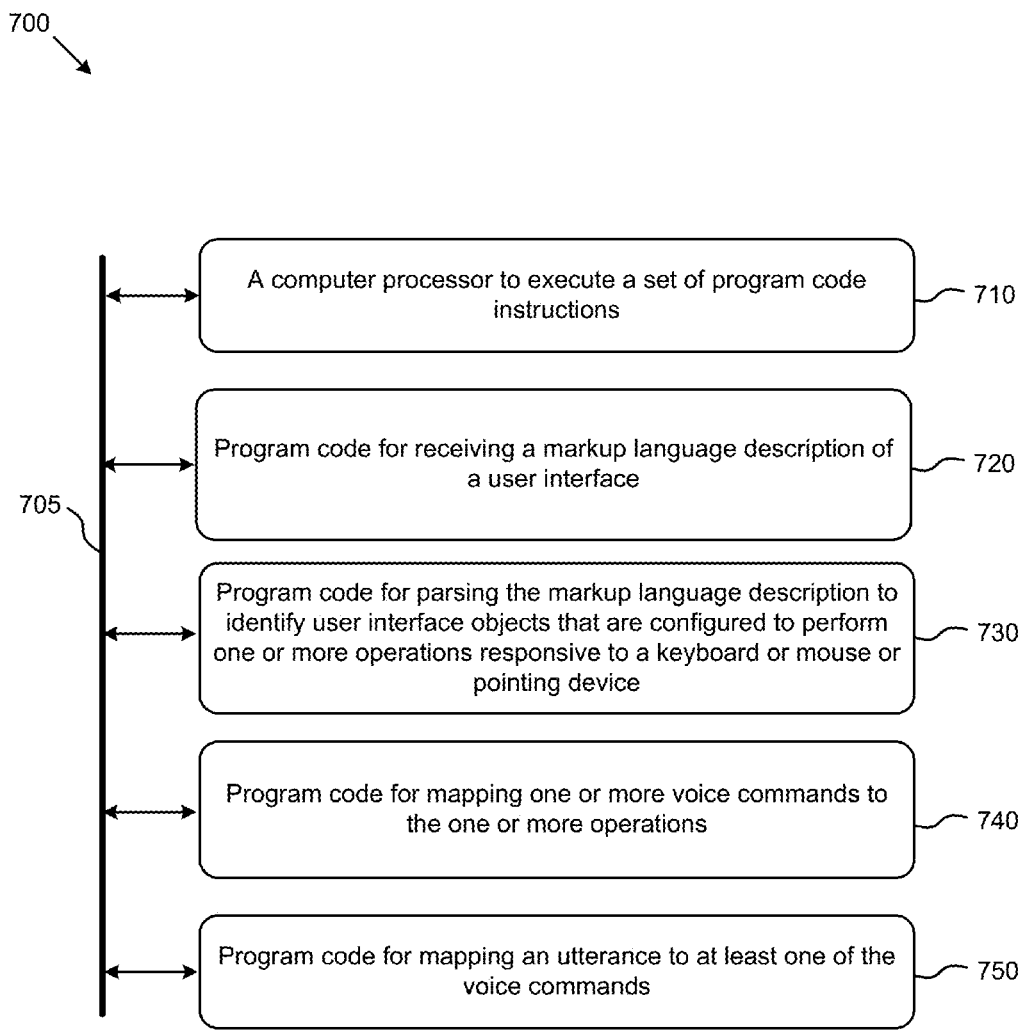
FIG. 7 is a block diagram of a system for voice recognition of commands extracted from a user interface description, according to some embodiments.

FIG. 7 is a block diagram of a system for voice recognition of commands extracted from a user interface description, according to some embodiments. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: using a computing system having at least one processor to perform a process, the process comprising (see module 720); receiving a markup language description of a user interface page (see module 730); parsing the markup language description to identify at least one user interface object configured to perform at least one operation responsive to a keyboard or mouse or pointing device (see module 740); and mapping one or more voice commands to the at least one operation (see module 750).

System Architecture Overview

Additional System Architecture Examples

Figure 8:
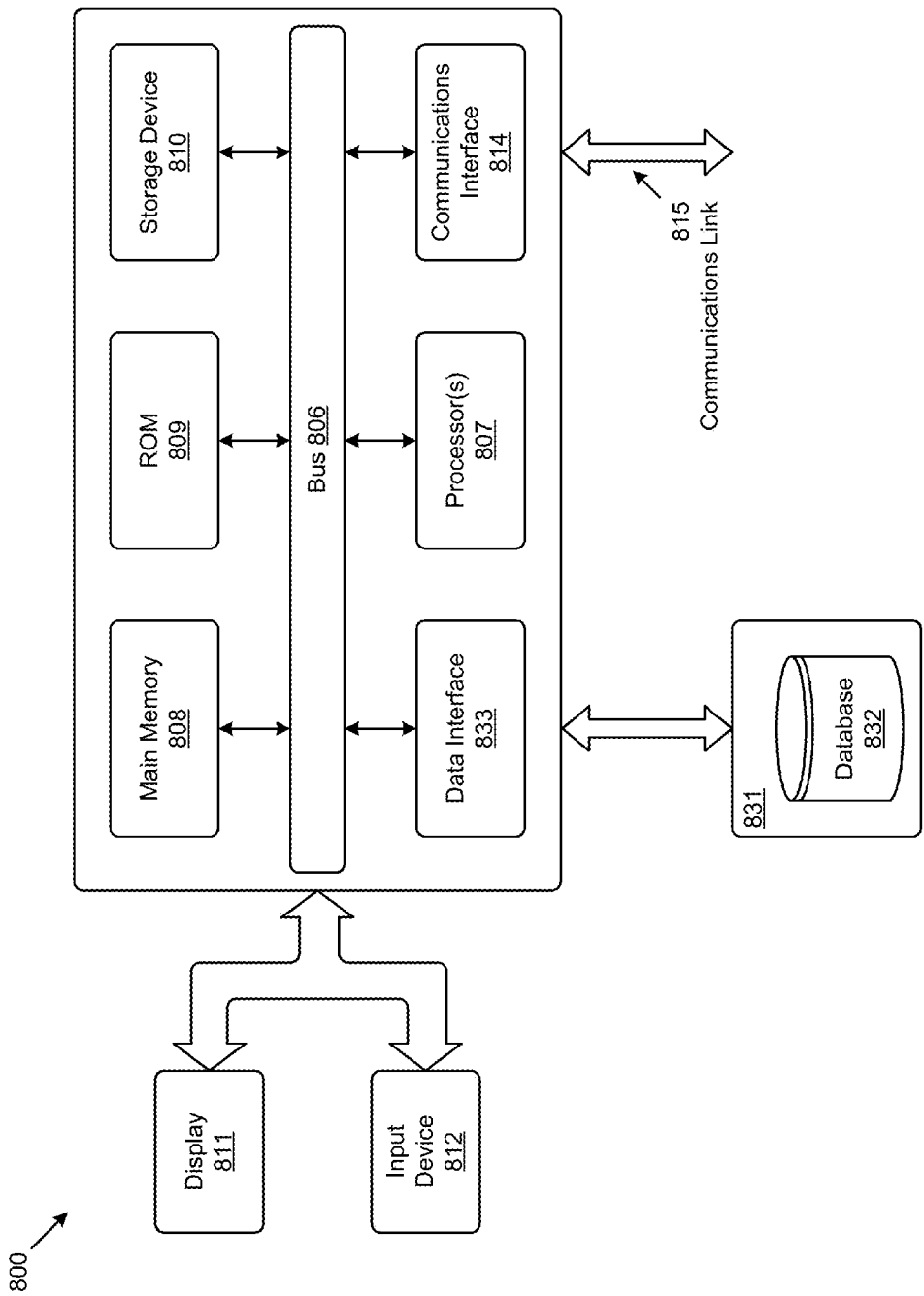
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to certain embodiments of the disclosure, two or more computer systems 800 coupled by a communications link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communications link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A method comprising:
   using a computing system having at least one processor to perform a process, the process comprising:
      creating a voice command mapping in response to loading a user interface page at the computing system by:
         identifying a markup language description of the user interface page loaded at the computing system, the identification of the markup language description occurring after loading the user interface page at the computing system; and
         generating the voice command mapping for the user interface page loaded at the computing system, wherein the voice command mapping maps a recognized word or phrase associated with at least one operation to one or more voice commands by parsing the markup language description identified from the user interface page to identify at least one user interface object specified by the markup language description configured to perform at least one operation responsive to a keyboard, mouse, or pointing device, the parsing of the markup language description being performed after loading the user interface page at the computing system, and the parsing does not create a modified version of the user interface page, wherein the voice command mapping uses a hash map data structure to store a relationship between at least one respective word or phrase to the at least one operation;
      processing an utterance in response to receiving the utterance at the computing system, the computing system displaying the user interface page, by:
         converting the utterance into a text representation of the utterance;
         determining a plurality of matches between the text representation of the utterance and multiple matching voice commands based on the voice command mapping for the user interface page loaded at the computing system; and
         performing a confirmation of a single matching voice command from among the plurality of matches.

2. The method of claim 1, wherein a user interface object of the at least one user interface object is at least one of, a button, a textbox, or a checkbox.

3. The method of claim 1, wherein a user interface object of the at least one user interface object comprises an option menu.

4. The method of claim 1, wherein the markup language description comprises HTML.

5. The method of claim 1, wherein the hash map data structure is built after a determination that the page permits voice navigation.

6. The method of claim 1, wherein the at least one operation comprises two or more operations.

7. The method of claim 6, wherein the confirmation of a single matching voice command from among the plurality of matches comprises disambiguation between the two or more operations.

8. The method of claim 1, wherein the voice command mapping uses a phonetic dictionary.

9. The method of claim 8, wherein the phonetic dictionary comprises words or phrases sorted in decreasing order of frequency of use.

10. A computer program product embodied in a non-transitory computer readable medium, the non-transitory computer readable medium having stored thereon a sequence of instructions which, when executed by a processor causes the processor to execute a process, the process comprising:
   creating a voice command mapping in response to loading a user interface page at a computing system by:
      identifying a markup language description of the user interface page loaded at the computing system, the identification of the markup language description occurring after loading the user interface page at the computing system; and generating the voice command mapping for the user interface page loaded at the computing system, wherein the voice command mapping maps a recognized word or phrase associated with at least one operation to one or more voice commands by parsing the markup language description identified from the user interface page to identify at least one user interface object specified by the markup language description configured to perform at least one operation responsive to a keyboard, mouse, or pointing device, the parsing of the markup language description being performed after loading the user interface page at the computing system, and the parsing does not create a modified version of the user interface page, wherein the voice command mapping uses a hash map data structure to store a relationship between at least one respective word or phrase to the at least one operation;

processing an utterance in response to receiving the utterance at the computing system, the computing system displaying the user interface page, by:

converting the utterance into a text representation of the utterance;

determining a plurality of matches between the text representation of the utterance and multiple matching voice commands based on the voice command mapping for the user interface page loaded at the computing system; and performing a confirmation of a single matching voice command from among the plurality of matches.

11. The computer program product of claim 10, wherein a user interface object of the at least one user interface object is at least one of, a button, a textbox, or a checkbox.

12. The computer program product of claim 10, wherein a user interface object of the at least one user interface object comprises an option menu.

13. The computer program product of claim 10, wherein the markup language description comprises HTML.

14. The computer program product of claim 10, wherein the hash map data structure is built after a determination that the page permits voice navigation.

15. The computer program product of claim 10, wherein the at least one operation comprises two or more operations.

16. The computer program product of claim 15, wherein the confirmation of a single matching voice command from among the plurality of matches comprises disambiguation between the two or more operations.

17. The computer program product of claim 10, wherein the voice command mapping uses a phonetic dictionary.

18. A computer system comprising:

a parser module for processing data, wherein the parser module is stored in memory, the parser module to identify a markup language description of a user interface page loaded at the computer system, identification of the markup language description occurring after loading the user interface page at the computer system, and the parser module to generate a voice command mapping for the user interface page loaded at the computer system in response to loading the user interface page at the computer system, wherein the voice command mapping maps a recognized word or phrase associated with at least one operation to one or more voice commands by parsing the markup language description identified from the user interface page to identify at least one user interface object specified by the markup language description configured to perform at least one operation responsive to a keyboard, mouse, or pointing device, the parsing of the markup language description being performed after loading the user interface page at the computer system, and the parsing does not create a modified version of the user interface page, wherein the voice command mapping uses a hash map data structure to store a relationship between at least one respective word or phrase to the at least one operation;

a receiving module for processing data, wherein the receiving module is stored in memory, the receiving module to process an utterance in response to receiving an utterance at the computer system displaying the user interface page and to convert the utterance into a text representation of the utterance wherein the utterance is used to determine a plurality of matches between the text representation of the utterance and multiple matching voice commands based on the voice command mapping for the user interface page loaded at the computer system; and a confirmation module for processing data, wherein the receiving module is stored in memory, the confirmation module to perform a confirmation of a single matching voice command from among the plurality of matches.

19. The computer system of claim 18, wherein a user interface object of the at least one user interface object is at least one of, a button, a textbox, or a checkbox.

20. The computer system of claim 18, wherein the markup language description comprises HTML.

* * * * *

UNITED STATES PATENT AND TRADEMARK OFFICE
CERTIFICATE OF CORRECTION

PATENT NO. : 9,858,039 B2
APPLICATION NO. : 14/166806
DATED : January 2, 2018
INVENTOR(S) : Kumar et al.

It is certified that error appears in the above-identified patent and that said Letters Patent is hereby corrected as shown below:

On the Title Page

Column 1, under Assignee, Line 2, delete "Redwood Shores" and insert -- Redwood Shores, (US) --, therefor.

On page 2, Column 2, under Other Publications, Line 5, delete "About" and insert -- About.com, --, therefor.

On page 2, Column 2, under Other Publications, Line 5, delete "Desigh" and insert -- Design --, therefor.

In the Specification

In Column 17, Line 31, delete "PTSN," and insert -- PSTN, --, therefor.

Signed and Sealed this
Seventeenth Day of July, 2018

Andrei Iancu
*Director of the United States Patent and Trademark Office*